United States Patent
Minato et al.

(10) Patent No.: US 10,340,845 B2
(45) Date of Patent: Jul. 2, 2019

(54) POWER STORAGE SYSTEM, VOLTAGE TRANSFORMER AND POWER STORAGE POWER CONDITIONER

(71) Applicant: OMRON Corporation, Kyoto (JP)

(72) Inventors: Atsuo Minato, Otsu (JP); Katsumi Ohashi, Kyoto (JP); Arata Yoneda, Muko (JP); Kazumi Tsuchimichi, Kyoto (JP); Katsutaka Tanabe, Moriyama (JP); Junichiro Yamada, Kizugawa (JP); Yasuhiro Tsubota, Moriyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/129,811

(22) Filed: Sep. 13, 2018

(65) Prior Publication Data
US 2019/0165725 A1 May 30, 2019

(30) Foreign Application Priority Data
Nov. 29, 2017 (JP) .................................. 2017-229667

(51) Int. Cl.
*H02S 40/32* (2014.01)
*H02J 3/38* (2006.01)
(Continued)

(52) U.S. Cl.
CPC ............. *H02S 40/32* (2014.12); *H02J 3/383* (2013.01); *H02M 7/4807* (2013.01); *H02M 7/515* (2013.01); *H02S 40/38* (2014.12)

(58) Field of Classification Search
CPC ...... H02J 3/383; H02M 7/4807; H02M 7/515; H02M 3/156–158; H02M 3/1584; H02M 3/285
(Continued)

(56) References Cited

U.S. PATENT DOCUMENTS

| 8,970,161 B1 * | 3/2015 | Cuadros ................ H02J 7/0068 320/101 |
| 9,276,410 B2 * | 3/2016 | Binder .................... H02J 3/383 |

(Continued)

FOREIGN PATENT DOCUMENTS

| JP | 2009089541 | 4/2009 |
| JP | 2012222908 | 11/2012 |

(Continued)

OTHER PUBLICATIONS

Office Action of Taiwan Counterpart Application, with English translation thereof, dated Feb. 22, 2019, pp. 1-6.

*Primary Examiner* — Yemane Mehari
(74) *Attorney, Agent, or Firm* — JCIPRNET (57) ABSTRACT

A voltage transform part transforms the direct-current power input to an input part. A first input and output part outputs the transformed direct-current power to a battery unit and to which direct-current power is input from the battery unit. A conversion part converts the direct-current power input to the input part into alternating-current power. A second input and output part outputs the alternating-current power to a power system or a load and to which an alternating-current power is input from the power system. The conversion part converts the alternating-current power input to the second input and output part into direct-current power. The second voltage transform part transforms the direct-current power converted by the conversion part and transforms the direct-current power input to the first input and output part. The conversion part converts the direct-current power transformed by the second voltage transform part into alternating-current power.

10 Claims, 5 Drawing Sheets

(51) Int. Cl.
*H02M 7/515* (2007.01)
*H02S 40/38* (2014.01)
*H02M 7/48* (2007.01)

(58) Field of Classification Search
USPC .......................................... 363/65, 74, 75, 78
See application file for complete search history.

(56) References Cited

U.S. PATENT DOCUMENTS

| | | | | |
|---|---|---|---|---|
| 2004/0084968 A1* | 5/2004 | Lee | ......................... | H02J 9/062 |
| | | | | 307/66 |
| 2009/0034300 A1* | 2/2009 | Ito | ....................... | H02M 1/4233 |
| | | | | 363/17 |
| 2011/0210694 A1 | 9/2011 | Uehashi et al. | | |
| 2015/0092462 A1* | 4/2015 | Ohori | ....................... | H02M 7/44 |
| | | | | 363/71 |
| 2016/0059803 A1* | 3/2016 | Klesyk | .................. | H02J 7/1438 |
| | | | | 307/9.1 |

FOREIGN PATENT DOCUMENTS

| | | |
|---|---|---|
| TW | 200627779 | 8/2006 |
| TW | 201347353 | 11/2013 |

\* cited by examiner

POWER STORAGE SYSTEM, VOLTAGE TRANSFORMER AND POWER STORAGE POWER CONDITIONER

CROSS-REFERENCE TO RELATED APPLICATION

This application claims the priority benefit of Japan Patent Application No. 2017-229667, filed on Nov. 29, 2017. The entirety of the above-mentioned patent application is hereby incorporated by reference herein and made a part of this specification.

BACKGROUND

Technical Field

The disclosure relates to a power storage system.

Description of Related Art

A power conditioner in which a voltage of direct-current (DC) power obtained from a solar cell is stepped up by a DC/DC converter, the direct-current power is converted into alternating-current (AC) power, and the alternating-current power is output to a power system is known (for example, see Patent Document 1). A hybrid power conditioner in which power obtained from a solar cell array is converted into an alternating current to be supplied to an alternating-current load (electric product) and/or a power system and a storage battery can be charged with surplus power has been put to practical use (for example, see Patent Document 2).

PATENT DOCUMENTS

[Patent Document 1] Japanese Laid-Open No. 2009-089541
[Patent Document 2] Japanese Laid-Open No. 2012-222908

Figure 5:
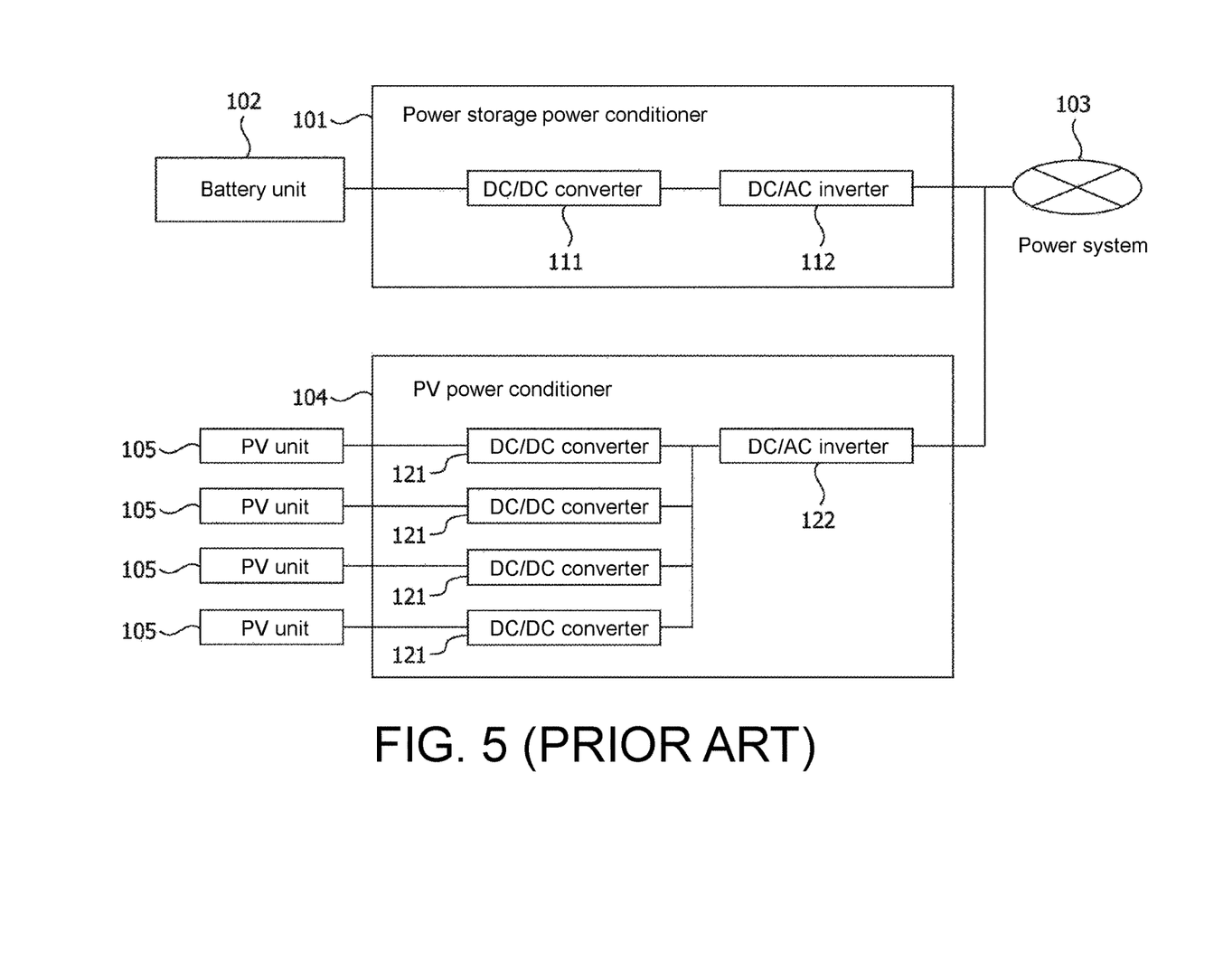
FIG. 5 is a diagram illustrating a configuration of a power storage system according to the related art.

FIG. 5 is a diagram illustrating a configuration of a power storage system according to the related art. A battery unit 102 and a power system 103 are connected to a power storage power conditioner 101. A plurality of photovoltaic (PV) units 105 and the power system 103 are connected to the PV power conditioner 104. The power storage power conditioner 101 includes a DC/DC converter 111 that steps up a voltage of direct-current power output from the battery unit 102 and a DC/AC converter 112 that converts the direct-current power input from the DC/DC converter 111 into alternating-current power and outputs the alternating-current power to the power system 103. The PV power conditioner 104 includes a DC/DC converter 121 that steps up a voltage of the direct-current power output from the PV unit 105 and a DC/AC inverter 122 that converts the direct-current power input from the DC/DC converter 121 into alternating-current power and outputs the alternating-current power to the power system 103.

Requests to append the power storage power conditioner 101 to the existing PV power conditioner 104 have increased. In addition, there have been requests to append the PV power conditioner 104 to the existing power storage power conditioner 101. When the power storage power conditioner 101 and the PV power conditioner 104 are linked, the DC/AC inverter 112 of the power storage power conditioner 101 and the DC/AC inverter 122 of the PV power conditioner 104 overlap. Therefore, cost increases and installation regions of the power storage power conditioner 101 and the PV power conditioner 104 increase. In view of such circumstances, the disclosure is set to promote cost reduction, miniaturization, and increase conversion efficiency of the power storage system.

SUMMARY

In the disclosure, the following parts are adopted. That is, according to an aspect of the disclosure, a power storage system includes a voltage transformer and a power storage power conditioner. The voltage transformer includes a first input part to which direct-current power output from a power generator ifs input, a first voltage transform part that transforms a voltage of the direct-current power input to the first input part into a first predetermined voltage, and a first output part that outputs the direct-current power transformed into the first predetermined voltage to the power storage power conditioner. The power storage power conditioner includes a second input part to which the direct-current power output from the first output part is input, a second voltage transform part that transforms the first predetermined voltage of the direct-current power input to the second input part into a second predetermined voltage, a first input and output part that outputs the direct-current power transformed into the second predetermined voltage to a battery unit and to which direct-current power is input from the battery unit, a conversion part that converts the direct-current power input to the second input part into alternating-current power, and a second input and output part that outputs the alternating-current power to a power system or a load and to which alternating-current power is input from the power system. The conversion part converts the alternating-current power input to the second input and output part into direct-current power. The second voltage transform part transforms a voltage of the direct-current power converted by the conversion part into the second predetermined voltage and transforms a voltage of the direct-current power input to the first input and output part into a third predetermined voltage. The conversion part converts the direct-current power transformed into the third predetermined voltage by the second voltage transform part into alternating-current power.

According to still another aspect of the disclosure, a power storage power conditioner in the power storage system includes a second communication part that communicates with the voltage transformer. The second communication part may transmit a predetermined voltage value to the voltage transformer. In the power storage power conditioner, the second communication part may transmit a control signal including at least one of a running start instruction, a running stop instruction, and an output start instruction to the voltage transformer.

DESCRIPTION OF THE EMBODIMENTS

In the power storage system, the conversion part of the power storage power conditioner converts the direct-current power input from the voltage transformer to the power storage power conditioner into the alternating-current power. Therefore, the voltage transformer does not include a converter that converts direct-current power into alternating-current power. Accordingly, in the power storage system, the voltage transformer does not include a converter. Thus, it is possible to achieve miniaturization and cost reduction of the voltage transformer and it is possible to promote miniaturization, cost reduction, and increased conversion efficiency of the power storage system.

In the power storage system, the voltage transformer may include a first communication part that communicates with the power storage power conditioner, and a control part that controls the first voltage transform part. The power storage power conditioner may include a second communication part that communicates with the voltage transformer. The second communication part may transmit a predetermined voltage value to the voltage transformer. The first communication part receives the predetermined voltage value from the power storage power conditioner. The control part may control a voltage transform operation of the first voltage transform part based on the predetermined voltage value. In the power storage system, it is possible to control the voltage transform operation of the first voltage transform part based on the predetermined voltage value transmitted from the power storage power conditioner to the voltage transformer.

In the power storage system, the second communication part may transmit a control signal including at least one of a running start instruction, a running stop instruction, and an output start instruction to the voltage transformer. The first communication part may receive the control signal from the power storage power conditioner. The control part may control running start, running stop, and output start of the first voltage transform part based on the control signal. In the power storage system, it is possible to control running start, running stop, and output start of the first voltage transform part based on the control signal transmitted from the power storage power conditioner to the voltage transformer.

In the power storage system, the number of voltage transformers may be adjustable. According to another aspect of the disclosure, a voltage transformer in the power storage system includes: a first communication part that communicates with the power storage power conditioner; and a control part that controls the first voltage transform part. The first communication part may receive a predetermined voltage value from the power storage power conditioner. The control part may control a voltage transform operation of the first voltage transform part based on the predetermined voltage value. In the voltage transformer, the first communication part may receive a control signal including at least one of a running start instruction, a running stop instruction, and an output start instruction from the power storage power conditioner. The control part may control running start, running stop, and output start of the first voltage transform part based on the control signal.

According to the disclosure, it is possible to promote cost reduction, miniaturization, and increased conversion efficiency of the power storage system.

Hereinafter, an embodiment will be described with reference to the drawings. The following embodiment is one aspect of the present application and does not limit the technical scope of the present application.

Application Example

Figure 1:
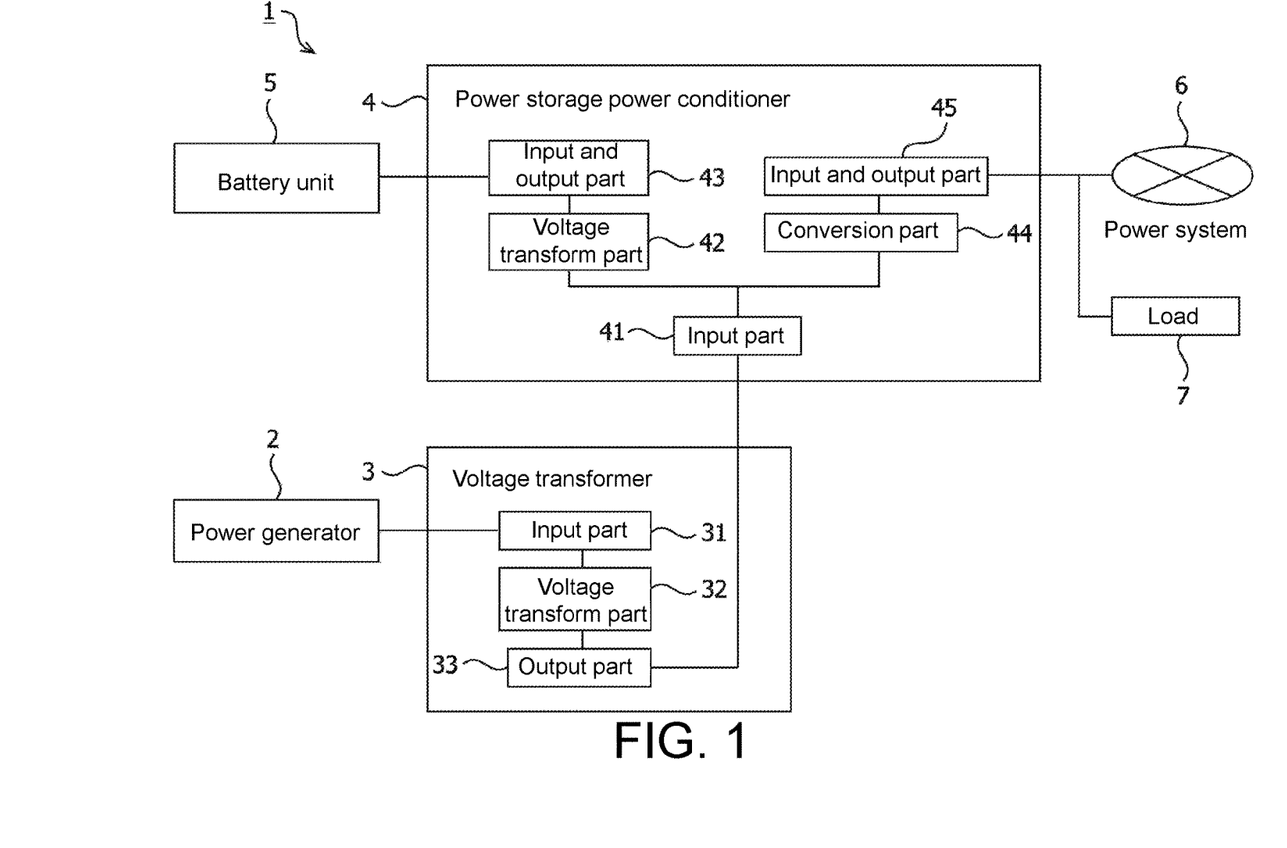
FIG. 1 is a diagram illustrating an example of a power storage system according to an embodiment.

FIG. 1 is a diagram illustrating an example of a power storage system 1 according to an embodiment. The power storage system 1 includes a power generator 2, a voltage transformer 3, a power storage power conditioner 4, and a battery unit 5. The power generator 2 is a device that can generate power and is, for example, a photovoltaic (PV) unit, a fuel cell (FC) unit, and a wind power generation unit. The power generator 2 inputs generated direct-current power to the voltage transformer 3. The voltage transformer 3 includes an input part 31, a voltage transform part 32, and an output part 33. The direct-current power output from the power generator 2 is input to the input part 31. The input part 31 is an example of a first input part. The voltage transform part 32 transform is a voltage of the direct-current power input to the input part 31 into the first predetermined voltage. The voltage transform part 32 is, for example, a non-insulated DC/DC converter or an insulated DC/DC converter. The voltage transform part 32 is an example of a first voltage transform part. The output part 33 inputs the direct-current power transformed into a first predetermined voltage to the power storage power conditioner 4. The output part 33 is an example of an output part. The power storage system 1 may include the plurality of power generators 2. The voltage transformer 3 may include the plurality of input parts 31 respectively connected to the plurality of power generators 2, the plurality of voltage transform parts 32, and the plurality of output parts 33.

The power storage power conditioner 4 includes an input part 41, a voltage transform part 42, an input and output part 43, a conversion part 44, and an input and output part 45. The direct-current power output from the output part 33 of the voltage transformer 3 is input to the input part 41. The input part 41 is an example of a second input part. The voltage transform part 42 transforms a first predetermined voltage of the direct-current power input to the input part 41 into a second predetermined voltage. The voltage transform part 42 is, for example, a non-insulated DC/DC converter or an insulated DC/DC converter. The voltage transform part 42 is an example of a second voltage transform part. The input and output part 43 outputs the direct-current power transformed into the second predetermined voltage to the battery unit 5. Direct-current power output from the battery unit 5 is input to the input and output part 43. The input and output part 43 is an example of a first input and output part. The voltage transform part 42 transforms a voltage of the direct-current power input to the input and output part 43 into a third predetermined voltage. The conversion part 44 converts the direct-current power input to the input part 41 into alternating-current power. The conversion part 44 is, for example, a DC/AC inverter. The conversion part 44 converts the direct-current power transformed into the third predetermined voltage by the voltage transform part 42 into alternating-current power. The input and output part 45 outputs the alternating-current power to the power system 6 or the load 7. The input and output part 45 is an example of a second input and output part. The alternating-current power output from the power system 6 is input to the input and output part 45. The conversion part 44 converts the alternating-current power input from the input and output part 45 into direct-current power. The voltage transform part 42 transforms a voltage of the direct-current power converted by the conversion part 44 into the second predetermined voltage.

The battery unit 5 is a rechargeable secondary battery. For example, a lithium ion battery or any of various secondary batteries can be applied. The first predetermined voltage and the third predetermined voltage are appropriate voltages when alternating-current power is output to the power system 6 or the load 7. The second predetermined voltage is an appropriate voltage when direct-current power is output to the battery unit 5. The first predetermined voltage and the second predetermined voltage are different values. The first predetermined voltage and the third predetermined voltage may be the same value or may be different values. The conversion part 44 of the power storage power conditioner 4 converts the direct-current power input from the voltage transformer 3 to the power storage power conditioner 4 into alternating-current power. Therefore, the voltage transformer 3 does not include a DC/AC inverter that converts direct-current power into alternating-current power. In the power storage system 1, the voltage transformer 3 does not include a DC/AC inverter. Thus, it is possible to achieve miniaturization and cost reduction of the voltage transformer 3 and it is possible to promote miniaturization, cost reduction, and increased conversion efficiency of the power storage system 1.

Example

Figure 2:
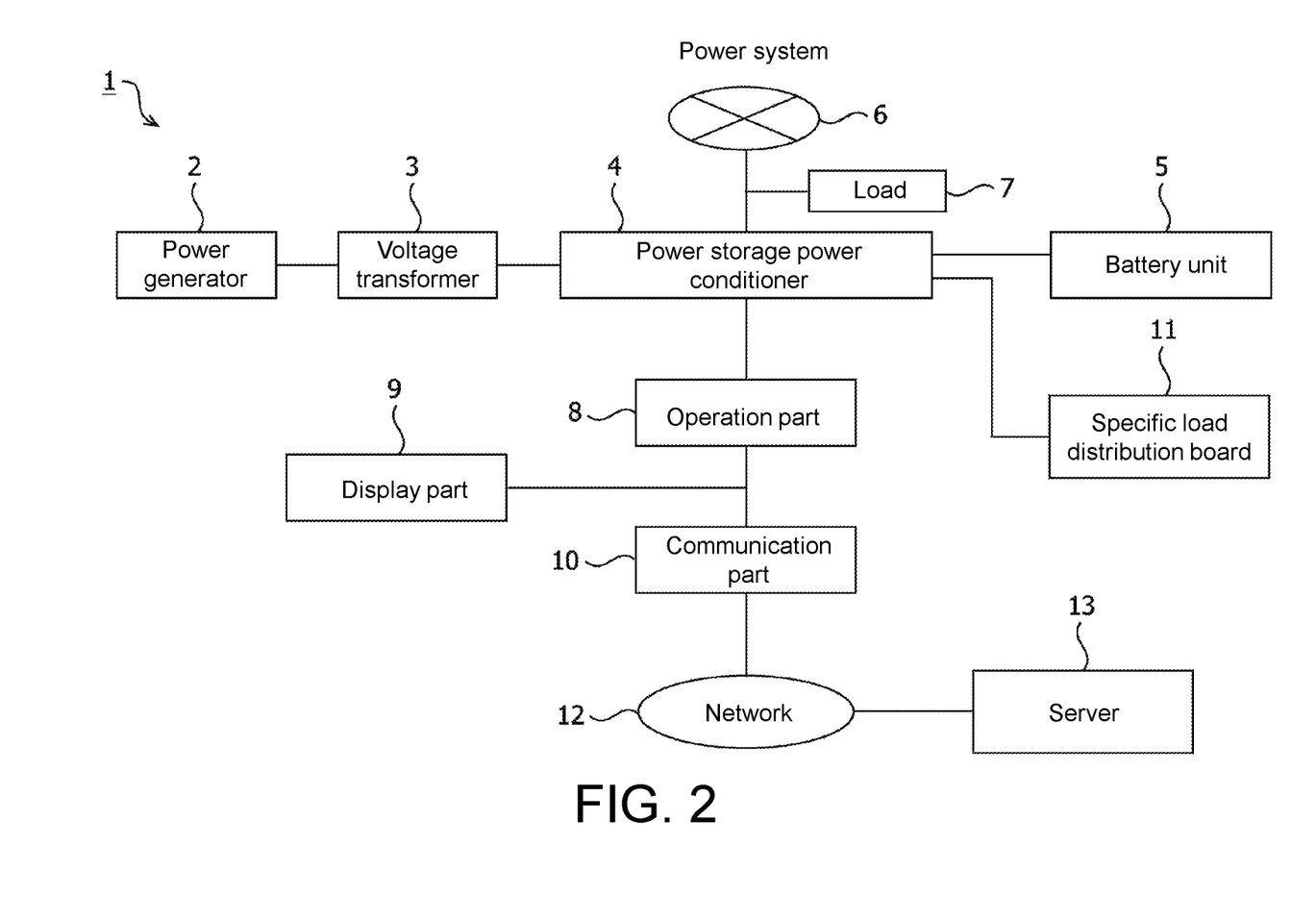
FIG. 2 is a diagram illustrating an example of an entire configuration of the power storage system according to the embodiment.

FIG. 2 is a diagram illustrating an example of an entire configuration of the power storage system 1 according to the embodiment. The power storage system 1 includes the power generator 2, the voltage transformer 3, the power storage power conditioner 4, the battery unit 5, an operation part 8, a display part 9, a communication part 10, and a specific load distribution board 11. The power generator 2 is a device that can generate power and is, for example, a PV unit, an FC unit, and a wind power generation unit. The power generator 2 may include the plurality of PV units, the plurality of FC units, and the plurality of wind power generation units. The power generator 2 inputs the generated direct-current power to the voltage transformer 3. The power generator 2 and the voltage transformer 3 are connected to each other via a cable or the like. The voltage transformer 3 includes a non-insulated DC/DC converter or an insulated DC/DC converter. The voltage transformer 3 may include a plurality of DC/DC converters. The voltage transformer 3 transforms a voltage of the direct-current power input from the power generator 2 and inputs the transformed direct-current power to the power storage power conditioner 4. The voltage transformer 3 and the power storage power conditioner 4 are connected to each other by a cable or the like. The voltage transformer 3 can be detachably mounted on the power storage power conditioner 4. Even when the voltage transformer 3 is not mounted on the power storage power conditioner 4, the power storage power conditioner 4 can operate alone. In the example of FIG. 2, the number of voltage transformers 3 is 1, but the disclosure is not limited to the example of FIG. 2. The number of voltage transformers 3 may be plural and the number of voltage transformers 3 is adjustable.

The power storage power conditioner 4 includes, for example, a non-insulated DC/DC converter or an insulated DC/DC converter and DC/AC inverter. The power storage power conditioner 4 transforms the voltage of the direct-current power input from the voltage transformer 3 and inputs the transformed direct-current power to the battery unit 5. The battery unit 5 is a rechargeable secondary cell. For example, a lithium ion battery or any of various secondary batteries can be applied. When the direct-current power is input from the power storage power conditioner 4 to the battery unit 5, the battery unit 5 is charged. When the battery unit 5 is discharged, the direct-current power is input from the battery unit 5 to the power storage power conditioner 4. The power storage power conditioner 4 converts the direct-current power input from the battery unit 5 into the alternating-current power and outputs the alternating-current power to the power system 6 or the load 7.

The power storage power conditioner 4 transforms the voltage of the direct-current power input from the voltage transformer 3, converts the transformed direct-current power into the alternating-current power, and outputs the alternating-current power to the power system 6 or the load 7. The power storage power conditioner 4 converts the alternating-current power input from the power system 6 into the direct-current power, transforms the voltage of the direct-current power, and inputs the transformed direct-current power to the battery unit 5.

The operation part 8 is a remote controller that inputs an instruction signal to the power storage power conditioner 4 to operate the power storage power conditioner 4. The operation part 8 may be configured as an input device such as a keyboard, a mouse, a keypad, or an operation button. The operation part 8 may include a home energy management system (HEMS) controller. The HEMS is a system that manages home power consumption. VPP is a system that collectively manages a plurality of small-sized power generation facilities via a network. The display part 9 displays various kinds of information. The display part 9 is, for example, a cathode ray tube (CRT) display, a liquid crystal display, a plasma display, or an organic electroluminescence (EL) display. The communication part 10 is an interface that communicates with a server 13 connected to a network 12. The communication part 10 includes, for example, a router or a modem. The network 12 includes, for example, a public network such as the Internet or a local area network (LAN). By providing the specific load distribution board 11, it is possible to automatically supply power from the power generator 2 and the battery unit 5 to an electric product (a specific load) connected to the specific load distribution board 11 at the time of a power failure. Not all of the constituent elements of the power storage system 1 illustrated in FIG. 2 are requisite and constituent elements of the power storage system 1 can be appropriately added or deleted so that the power storage system 1 can be realized.

Figure 3:
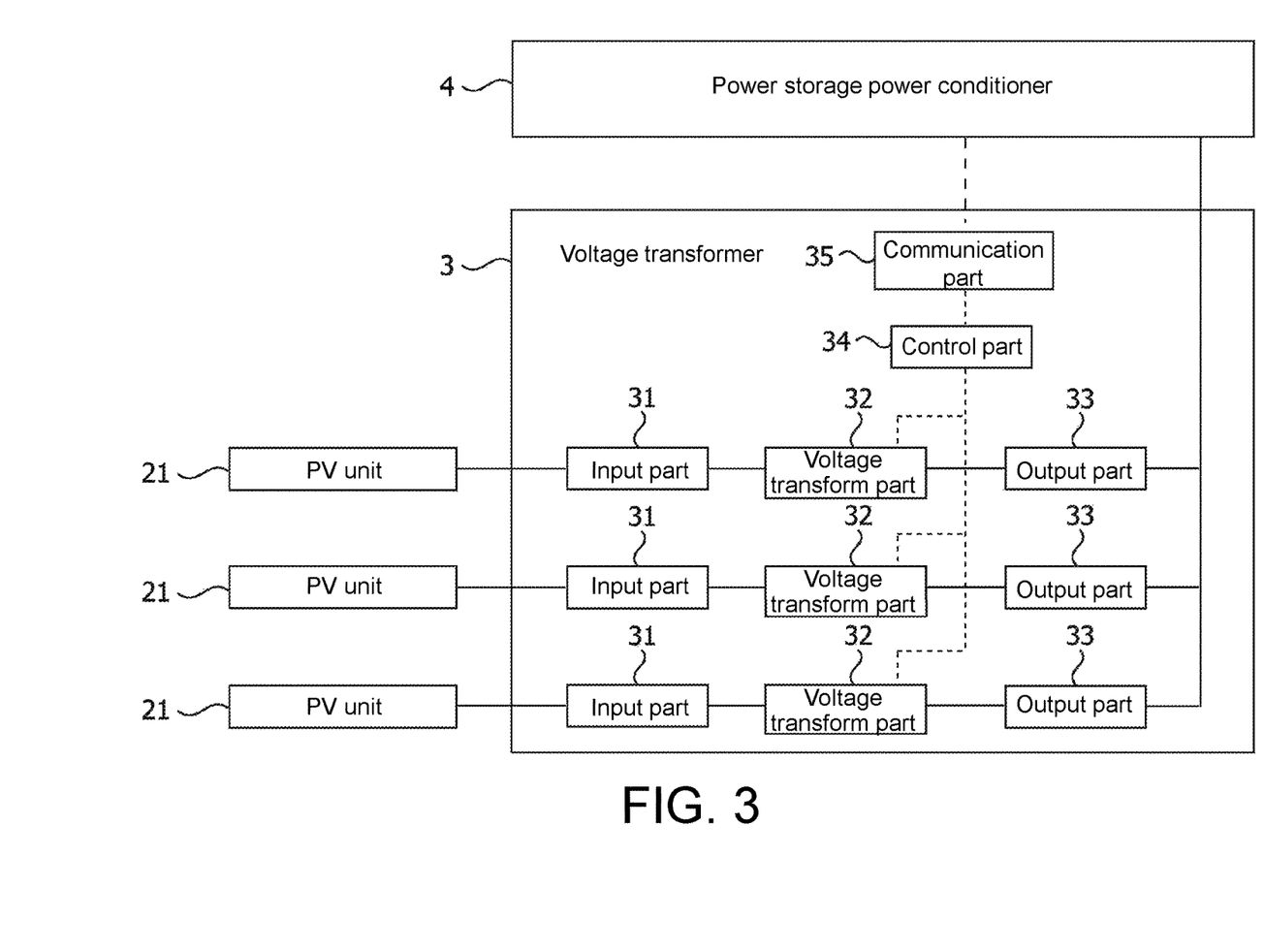
FIG. 3 is a diagram illustrating an example of a voltage transformer according to the embodiment.

FIG. 3 is a diagram illustrating an example of the voltage transformer 3 according to the embodiment. In the example of FIG. 3, the plurality of PV units 21 are connected to the voltage transformer 3. The disclosure is not limited to the example of FIG. 3 and a plurality of FC units and a plurality of wind power generation units or the like may be connected to the voltage transformer 3 instead of the plurality of PV units 21. The voltage transformer 3 includes a plurality of input parts 31, a plurality of voltage transform parts 32, a plurality of output parts 33, a control part 34 and a communication part 35. The common output part 33 may be used instead of the plurality of output parts 33. The input part 31 has a connection terminal used for connection with the PV unit 21. The direct-current power output from the PV unit 21 is input to the input part 31. The voltage transform part 32 is a voltage transform circuit that transforms (steps up or steps down) a voltage of the direct-current power. The voltage transform part 32 is, for example, a non-insulated DC/DC converter or an insulated DC/DC converter. The voltage transform part 32 transforms the voltage of the direct-current power input to the input part 31 into the first predetermined voltage. The first predetermined voltage is a larger value between a value obtained by adding 10 V to the voltage of the direct-current power output from the PV unit 21 and a value obtained by multiplying a peak value of a system voltage of the power system 6 by a predetermined coefficient. When the FC unit or the wind power generation unit is connected to the voltage transformer 3, the value of the first predetermined voltage may be appropriately changed.

The output part 33 has a connection terminal used for connection with the power storage power conditioner 4. The output part 33 inputs the direct-current power transformed into the first predetermined voltage to the power storage power conditioner 4. The plurality of PV units 21 and the plurality of input parts 31 are connected to each other. The plurality of input parts 31 and the plurality of voltage transform parts 32 are connected to each other. The plurality of voltage transform parts 32 and the plurality of output parts 33 are connected to each other. The plurality of output parts 33 are connected to the input part 41 of the power storage power conditioner 4. The plurality of PV units 21 can be removed from the voltage transformer 3. The plurality of PV units 21 may be removed and a plurality of FC units and a plurality of wind power generation units or the like may be connected to the voltage transformer 3.

The control part 34 controls the plurality of voltage transform parts 32. The control part 34 includes a processor such as a central processing part (CPU) or a micro-processing part (MPU) and a memory such as a random access memory (RAM) or a read-only memory (ROM). The control part 34 may include one CPU or MPU or may include a plurality of CPUs and a plurality of MPUs may be combined. The CPU and the MPU are not limited to the single processors and may be multi-processors. The control part 34 performs various processes in accordance with a computer program loaded to be executable on the memory. The communication part 35 performs communication with the power storage power conditioner 4 in a wired or wireless manner. The communication part 35 transmits various kinds of information to the power storage power conditioner 4 and receives various kinds of information from the power storage power conditioner 4. The information received from the power storage power conditioner 4 is delivered to the control part 34.

The communication part 35 receives a control signal from the power storage power conditioner 4. The communication part 35 transmits a response signal to the power storage power conditioner 4 when the communication part 35 receives the control signal. The control signal includes at least one of a running start instruction, a running stop instruction, and an output start instruction. The control part 34 controls running start, running stop, and output start of the voltage transform part 32 based on the control signal. The output start instruction includes a predetermined voltage value. The control part 34 controls a voltage transform operation of the voltage transform part 32 based on the predetermined voltage value included in the output start instruction. Under the control of the control part 34, the voltage transform part 32 transforms the voltage of the direct-current power input to the input part 31 into the first predetermined voltage. The control part 34 may collectively control the plurality of voltage transform parts 32 or may independently control the plurality of voltage transform parts 32. For example, the control part 34 may control the plurality of voltage transform parts 32 so that the plurality of voltage transform parts 32 simultaneously start running. For example, the control part 34 may control the plurality of voltage transform parts 32 so that some of the plurality of voltage transform parts 32 start running and others of the plurality of voltage transform parts 32 stop running. The output part 33 inputs the direct-current power transformed into the first predetermined voltage to the power storage power conditioner 4.

Figure 4:
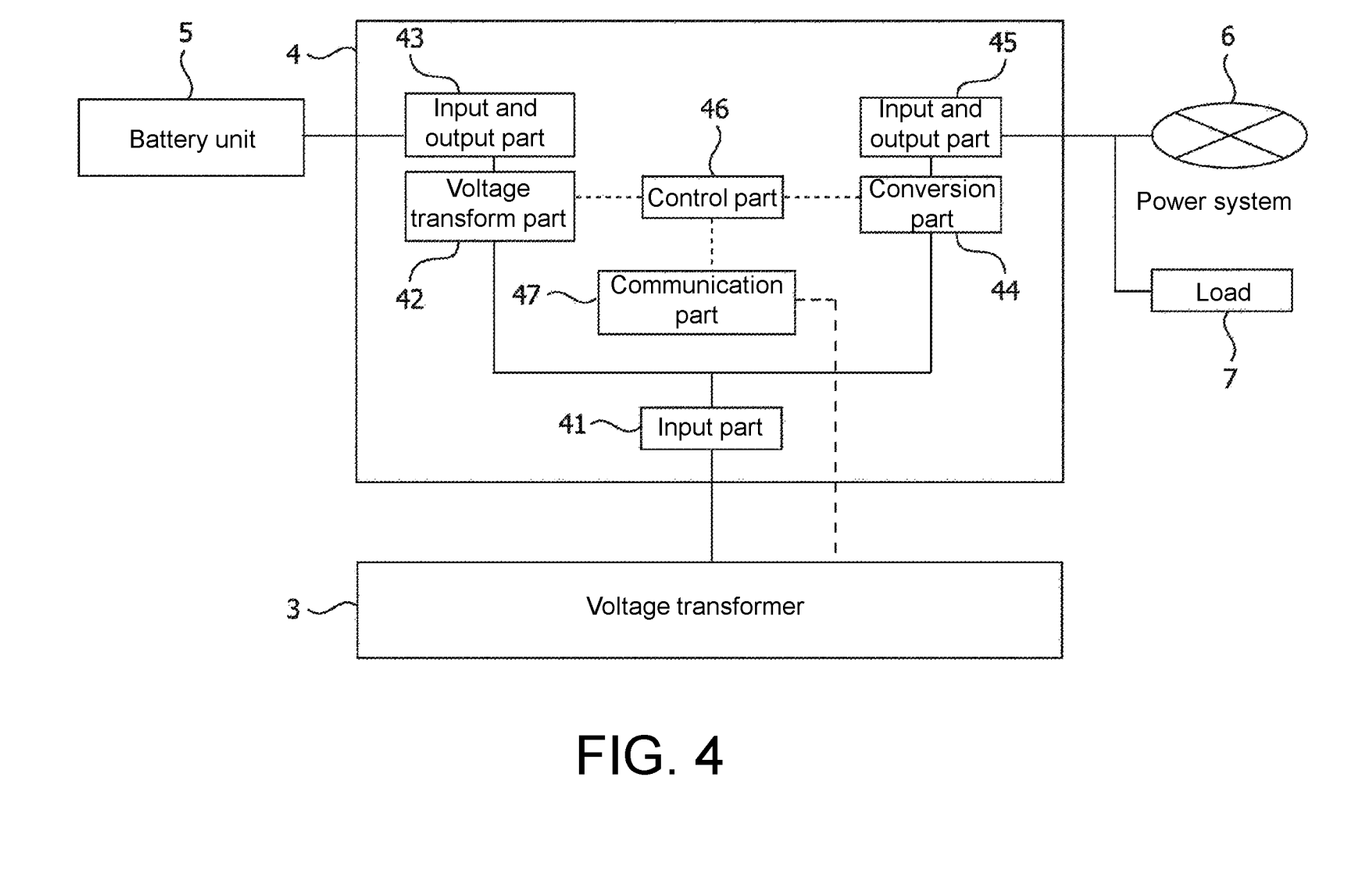
FIG. 4 is a diagram illustrating an example of a power storage power conditioner according to the embodiment.

FIG. 4 is a diagram illustrating an example the power storage power conditioner 4 according to the embodiment. The power storage power conditioner 4 includes the input part 41, the voltage transform part 42, the input and output part 43, the conversion part 44, the input and output part 45, a control part 46, and a communication part 47. The input part 41 has a connection terminal used for connection with the voltage transformer 3. The voltage transform part 42 is a voltage transform circuit that transforms a voltage of direct-current power. The voltage transform part 42 is for example, a non-insulated DC/DC converter or an insulated DC/DC converter. The input and output part 43 has a connection terminal used for connection with the battery unit 5. The conversion part 44 is a circuit that converts direct-current power into alternating-current power or converts alternating-current power into direct-current power. The conversion part 44 is, for example, a DC/AC inverter. The input and output part 45 has a terminal used for connection with a distribution board (not illustrated). The distribution board is disposed between the power storage power conditioner 4, and the power system 6 and the load 7. The power storage power conditioner 4 may include the plurality of input parts 41 or may connect the plurality of voltage transformers 3 to the power storage power conditioner 4.

The control part 46 controls the voltage transform part 42 and the conversion part 44. The control part 46 includes a process such as a CPU or an MPU and a memory such as a RAM or a ROM. The control part 46 may include one CPU or MPU or may include a plurality of CPUs and a plurality of MPUs may be combined. The CPU and the MPU are not limited to the single processors and may be multi-processors. The control part 46 performs various processes in accordance with a computer program loaded to be executable on the memory. The communication part 47 performs communication with the voltage transformer 3 in a wired or wireless manner. The communication part 47 transmits various kinds of information to the voltage transformer 3 and receives various kinds of information from the voltage transformer 3. The information received from the voltage transformer 3 is delivered to the control part 46. The communication part 47 transmits a control signal including at least one of running start instruction, a running stop instruction, and an output start instruction to the voltage transformer 3. The output start instruction includes a predetermined voltage value. The communication part 47 receives a response signal from the voltage transformer 3.

The control part 46 controls running and output of the voltage transform part 42 and controls running and output of the conversion part 44.

<First Control>

First control is control when direct-current power is input to the input part 41. Under the control of the control part 46, the voltage transform part 42 transforms the first predetermined voltage of the direct-current power input to the input part 41 into the second predetermined voltage and outputs the direct-current power. The input and output part 43 inputs the direct-current power transformed into the second predetermined voltage to the battery unit 5. When the direct-current power is input to the battery unit 5, the battery unit 5 is charged.

<Second Control>

Second control is control when direct-current power is input to the input part 41. Under the control of the control part 46, the conversion part 44 converts the direct-current power input to the input part 41 into the alternating-current power and outputs the alternating-current power. The input and output part 45 outputs the alternating-current power to the power system 6 or the load 7.

<Third Control>

Third control is control when direct-current power is input to the input and output part 43. When power is discharged from the battery unit 5, the direct-current power is input from the battery unit 5 to the input and output part 43. Under the control of the control part 46, the voltage transform part 42 transforms the voltage of the direct-current power input to the input and output part 43 into the third predetermined voltage and outputs the direct-current power. Under the control of the control part 46, the conversion part 44 converts the direct-current power output from the voltage transform part 42 into the alternating-current power and outputs the alternating-current power. The input and output part 45 outputs the alternating-current power to the power system 6 or the load 7. The third predetermined voltage is, for example, a value obtained by multiplying a peak value of a system voltage of the power system 6 by a predetermined coefficient. When the first predetermined voltage is the value obtained by multiplying the peak value of the system voltage of the power system 6 by the predetermined coefficient, the first predetermined voltage and the third predetermined voltage are the same value. When the first predetermined voltage is a value obtained by adding 10 V to the voltage of the direct-current power output from the PV unit 21, the first predetermined voltage and the third predetermined voltage are different values.

<Fourth Control>

Fourth control is control when alternating-current power is input from the power system 6 to the input and output part 45. Under the control of the control part 46, the conversion part 44 converts the alternating-current power input to the input and output part 45 into the direct-current power and outputs the direct-current power. Under the control part 46, the voltage transform part 42 transforms the voltage of the direct-current power output from the conversion part 44 into the second predetermined voltage and outputs the direct-current power. The input and output part 43 inputs the direct-current power transformed into the second predetermined voltage to the battery unit 5. When the direct-current power is input to the battery unit 5, the battery unit 5 is charged.

Depending on presence or absence of a power failure, a linkage running mode or a self-running mode is selected as a running mode of the power storage power conditioner 4. A user may select, for example, the linkage running mode or the self-running mode as the running mode of the power storage power conditioner 4. The running mode of the power storage power conditioner 4 may be selected using the operation part 8. The power storage power conditioner 4 may switch the running mode of the power storage power conditioner 4 when an input is received from the operation part 8.

A case in which the linkage running mode is selected as the running mode of the power storage power conditioner 4 will be described. Hereinafter, it is assumed that the voltage transformer 3 receives a control signal including a running start instruction of the voltage transform part 32 and an output instruction of the voltage transform part 32, and the output of the voltage transform part 32 starts. The control part 46 determines whether the direct-current power is input to the input part 41. When the direct-current power is not input to the input part 41 (input power=0 kW), the control part 46 transmits a control signal including a running stop instruction of the voltage transform part 32 to the voltage transformer 3 via the communication part 47. In this case, the control part 34 of the voltage transformer 3 stops the running of the voltage transform part 32 based on the running stop instruction of the voltage transform part 32. Depending on a charging situation of the battery unit 5, charging or discharging of the battery unit 5 may be performed. When the direct-current power is not input to the input part 41, the charging of the battery unit 5 may be performed using the direct-current power converted into the alternating-current power input to the input and output part 45.

When the linkage running mode is selected and the direct-current power is input to the input part 41, the control part 46 determines whether the direct-current power input to the input part 41 is equal to or less than a rated capacity of the power storage power conditioner 4. When the direct-current power input to the input part 41 is equal to or less than the rated capacity of the power storage power conditioner 4, the output of the conversion part 44 starts and the alternating-current power is output from the input and output part 45 to the power system 6 or the load 7. When the direct-current power input to the input part 41 is equal to or less than the rated capacity of the power storage power conditioner 4, the output of the conversion part 44 starts and the alternating-current power may be output from the input and output part 45 to the power system 6 or the load 7. Depending on a charging situation of the battery unit 5, charging or discharging of the battery unit 5 may be performed. When the direct-current power input to the input part 41 is equal to or less than the rated capacity of the power storage power conditioner 4, the battery unit 5 may be charged using the direct-current power input to the input part 41 and the direct-current power converted from the alternating-current power input to the input and output part 45.

When the linkage running mode is selected and the direct-current power input to the input part 41 is greater than the rated capacity of the power storage power conditioner 4, the output of the voltage transform part 42 and the output of the conversion part 44 start. Thus, the direct-current power is output from the input and output part 43 to the battery unit 5 and the alternating-current power is output from the input and output part 45 to the power system 6 or the load 7. Accordingly, the battery unit 5 is charged using the direct-current power input to the input part 41. The output of the voltage transform part 42 and the conversion part 44 may start, the direct-current power may be output from the input and output part 43 to the battery unit 5, and the alternating-current power may be output from the input and output part 45 to the power system 6 and the load 7.

A case in which the self-running mode is selected as the running mode of the power storage power conditioner 4 will be described. Hereinafter, it is assumed that the voltage transformer 3 receives a control signal including a running start instruction of the voltage transform part 32 and an output instruction of the voltage transform part 32 and the output of the voltage transform part 32 starts. The control part 46 determines whether the direct-current power is input to the input part 41. When the direct-current power is not input to the input part 41 (input power=0 kW), the control part 46 transmits a control signal including a running stop instruction of the voltage transform part 32 to the voltage transformer 3 via the communication part 47. In this case, the control part 34 of the voltage transformer 3 stops the running of the voltage transform part 32 based on the running stop instruction of the voltage transform part 32.

When the self-running mode is selected and the direct-current power is input to the input part 41, the control part 46 determines whether the direct-current power input to the input part 41 is equal to or less than the rated capacity of the power storage power conditioner 4. When the direct-current power input to the input part 41 is equal to or less than the rated capacity of the power storage power conditioner 4, the output of the conversion part 44 starts and the alternating-current power is output from the input and output part 45 to the load 7. When the direct-current power input to the input part 41 is equal to or less than the rated capacity of the power storage power conditioner 4, the output of the conversion part 44 starts and the alternating-current power may be output from the input and output part 45 to the load 7. Depending on a charging situation of the battery unit 5, charging or discharging of the battery unit 5 may be performed.

When the self-running mode is selected and the direct-current power input to the input part 41 is greater than the rated capacity of the power storage power conditioner 4, the output of the conversion part 44 starts and the alternating-current power is output from the input and output part 45 to the load 7. When the direct-current power input to the input part 41 is greater than the rated capacity of the power storage power conditioner 4, the output of the conversion part 44 may start and the alternating-current power may be output from the input and output part 45 to a specific load among the loads 7. Depending on a charging situation of the battery unit 5, charging or discharging of the battery unit 5 may be performed.

In the power storage system 1, the conversion part 44 of the power storage power conditioner 4 converts the direct-current power input from the voltage transformer 3 to the power storage power conditioner 4 into the alternating-current power. Therefore, the voltage transformer 3 does not include a DC/AC inverter that converters direct-current power into alternating-current power. Accordingly, in the power storage system 1, the voltage transformer 3 does not include a DC/AC inverter. Thus, it is possible to achieve miniaturization and cost reduction of the voltage transformer 3 and it is possible to promote miniaturization, cost reduction, and increased conversion efficiency of the power storage system 1.

What is claimed is:

1. A power storage system comprising:
a voltage transformer; and
a power storage power conditioner,
wherein the voltage transformer comprises
a first input part to which direct-current power output from a power generator is input,
a first voltage transform part that transforms a voltage of the direct-current power input to the first input part into a first predetermined voltage, and
a first output part that outputs the direct-current power transformed into the first predetermined voltage to the power storage power conditioner,
wherein the power storage power conditioner comprises
a second input part to which the direct-current power output from the first output part is input,
a second voltage transform part that transforms the first predetermined voltage of the direct-current power input to the second input part into a second predetermined voltage,
a first input and output part that outputs the direct-current power transformed into the second predetermined voltage to a battery unit and to which direct-current power is input from the battery unit,
a conversion part that converts the direct-current power input to the second input part into alternating-current power, and
a second input and output part that outputs the alternating-current power to a power system or a load and to which alternating-current power is input from the power system,
wherein the conversion part converts the alternating-current power input to the second input and output part into direct-current power,
wherein the second voltage transform part transforms a voltage of the direct-current power converted by the conversion part into the second predetermined voltage and transforms a voltage of the direct-current power input to the first input and output part into a third predetermined voltage, and
wherein the conversion part converts the direct-current power transformed into the third predetermined voltage by the second voltage transform part into alternating-current power.

2. The power storage system according to claim 1,
wherein the voltage transformer comprises
a first communication part that communicates with the power storage power conditioner, and
a control part that controls the first voltage transform part,
wherein the power storage power conditioner comprises a second communication part that communicates with the voltage transformer,
wherein the second communication part transmits a predetermined voltage value to the voltage transformer,
wherein the first communication part receives the predetermined voltage value from the power storage power conditioner, and
wherein the control part controls a voltage transform operation of the first voltage transform part based on the predetermined voltage value.

3. The power storage system according to claim 2,
wherein the second communication part transmits a control signal comprising at least one of a running start instruction, a running stop instruction, and an output start instruction to the voltage transformer,
wherein the first communication part receives the control signal from the power storage power conditioner, and
wherein the control part controls running start, running stop, and output start of the first voltage transform part based on the control signal.

4. The power storage system according to claim 1, wherein the number of voltage transformers is adjustable.

5. The power storage system according to claim 2, wherein the number of voltage transformers is adjustable.

6. The power storage system according to claim 3, wherein the number of voltage transformers is adjustable.

7. A voltage transformer in the power storage system according to claim 1, the voltage transformer comprising:
a first communication part that communicates with the power storage power conditioner; and
a control part that controls the first voltage transform part, wherein the first communication part receives a predetermined voltage value from the power storage power conditioner, and wherein the control part controls a voltage transform operation of the first voltage transform part based on the predetermined voltage value.

8. The voltage transformer according to claim 7, wherein the first communication part receives a control signal comprising at least one of a running start instruction, a running stop instruction, and an output start instruction from the power storage power conditioner, and wherein the control part controls running start, running stop, and output start of the first voltage transform part based on the control signal.

9. A power storage power conditioner in the power storage system according to claim 1, the power storage power conditioner comprising:

a second communication part that communicates with the voltage transformer, wherein the second communication part transmits a predetermined voltage value to the voltage transformer.

10. The power storage power conditioner according to claim 9, wherein the second communication part transmits a control signal comprising at least one of a running start instruction, a running stop instruction, and an output start instruction to the voltage transformer.

* * * * *